UNITED STATES PATENT OFFICE.

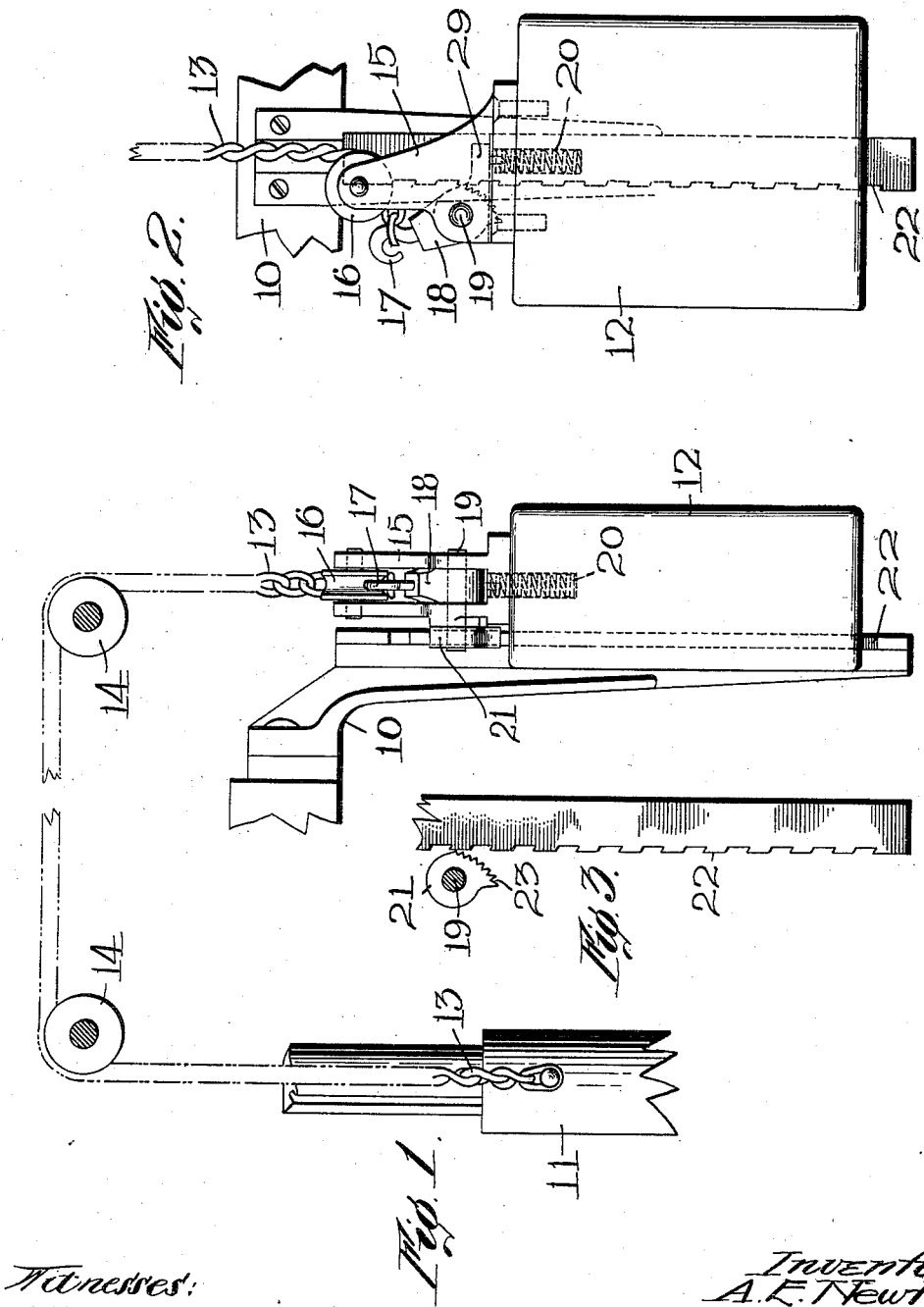

ALBERT E. NEWTON, OF WORCESTER, MASSACHUSETTS, ASSIGNOR TO PRENTICE BROS. COMPANY, A CORPORATION OF MASSACHUSETTS.

WEIGHT SAFETY DEVICE.

1,019,517.  Specification of Letters Patent.  Patented Mar. 5, 1912.

Application filed April 12, 1911. Serial No. 620,562.

*To all whom it may concern:*

Be it known that I, ALBERT E. NEWTON, a citizen of the United States, residing at Worcester, in the county of Worcester and State of Massachusetts, have invented a new and useful Weight Safety Device, of which the following is a specification.

This invention relates to a weight safety device.

The principal object of the invention is to provide a construction whereby upon the breakage of a chain which supports a counter-weight used on a machine tool, the counter-weight will be held from dropping, thus preventing serious accidents to the machinery.

The invention involves the use of means connected with the supporting chain or the like which when released by the breaking of the latter will automatically operate to clamp the weight in position and prevent its fall.

The invention also involves improvements in details of construction as will appear hereinafter.

Reference is to be had to the accompanying drawings in which—

Figure 1 is an elevation of a weight safety device constructed in accordance with this invention applied to a machine tool. Fig. 2 is an elevation of the same at right angles thereto, and Fig. 3 is an elevation similar to Fig. 2 with the weight removed and showing the parts in locking position.

The invention can be applied to upright and radial drills and to other machine tools in which a heavy operating part has to be counter-weighted. In the form shown, the invention is illustrated as applied to the frame 10 of an upright drill in which the quill 11 slides vertically and is connected with a counter-weight 12 by a chain or other flexible connection 13 passing over sheaves 14. The parts so far numbered are common in this class of machines. Instead of connecting the chain directly with the weight, however, the weight is provided with a frame or brackets 15 extending upwardly and supporting a sheave 16 under which the chain passes. The end of the chain is connected with a hook 17 mounted on an arm 18 on a shaft 19 mounted on bearings on the frame or brackets 15. Also on this shaft is another arm 29 which serves as a stop in the position shown in Fig. 2, so that the chain securely holds the weight. Under the arm 29 is a spring 20 which when the chain breaks, pushes the arm up, turns the shaft and swings the hook down. This turns an eccentric clutch 21 fixed to the shaft so as to bring its teeth into engagement with the teeth of a rack 22. The farther the spring swings the shaft around, the more efficiently will the clutch engage the rack to prevent the descent of the weight. The engagement of the clutch with the rack tends to further swing the former around into clutching position. This clutch is shown as having a series of clutch teeth 23 mounted on a curve gradually receding from the center so as to provide for more efficient action as the weight tends to descend.

While I have illustrated and described a preferred embodiment of the invention and shown it as applied to a drill, I am aware that it can be carried out with modifications in details of construction and that it can be applied to other machine tools without departing from the scope of the invention as expressed in the claims. Therefore, I do not wish to be limited to this particular application of the invention or to all the details of construction as shown and described, but What I do claim is:—

1. In a device of the character described, the combination of a counter-weight, a sheave journaled thereon, a flexible connection depending from above and passing under the sheave, a shaft journaled on the counter-weight and having an arm projecting upwardly at one side of the sheave, the end of said flexible connection being connected with said arm after passing under the sheave, an eccentric clutch on the shaft for engaging the frame, and means whereby when the support of the flexible connection is removed said shaft will be turned to bring said eccentric clutch into operation.

2. In a device of the character described, the combination of a vertical rack having teeth, a counter-weight slidable up and down the rack, a sheave journaled on the counter-weight, a shaft on the counter-weight having two arms thereon, a flexible supporting member passing under the sheave and connected with one arm at one side of the sheave, a spring supported on the counter-weight and bearing on the other arm and tending constantly to turn the arm and shaft about the axis of the shaft, and an eccentric clutch on said shaft in position to be forced into engagement with said rack when the shaft is turned by the spring.

3. In a device of the character described, the combination of a counter-weight having a frame or brackets extending upwardly therefrom, a sheave journaled in said frame or brackets, a flexible connection depending from above and passing under the sheave, a pivoted arm projecting upwardly at one side of the sheave with a hook thereon, the end of said flexible connection being connected with said hook after passing under the sheave, a clutch connected with the arm for engaging the frame, and means whereby when the support of the flexible connection is removed said clutch is brought into operation.

In testimony whereof I have hereunto set my hand, in the presence of two subscribing witnesses.

ALBERT E. NEWTON.

Witnesses:
 FRED K. HENDRICKSON,
 C. FORREST WESSON.

Copies of this patent may be obtained for five cents each, by addressing the "Commissioner of Patents, Washington, D. C."